United States Patent
Mori (10) Patent No.: US 10,562,245 B2
(45) Date of Patent: Feb. 18, 2020

(54) METHOD OF MANUFACTURING TANK

(71) Applicant: TOYOTA JIDOSHA KABUSHIKI KAISHA, Toyota-shi, Aichi-ken (JP)

(72) Inventor: Daigoro Mori, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 15/987,386

(22) Filed: May 23, 2018

(65) Prior Publication Data

US 2018/0345607 A1    Dec. 6, 2018

(30) Foreign Application Priority Data

Jun. 6, 2017 (JP) .................. 2017-111371

(51) Int. Cl.

| | |
|---|---|
| *B29C 70/56* | (2006.01) |
| *B29C 70/30* | (2006.01) |
| *B29C 53/80* | (2006.01) |
| *B29C 70/32* | (2006.01) |
| *B29C 70/54* | (2006.01) |

(Continued)

(52) U.S. Cl.
CPC ............. *B29C 70/56* (2013.01); *B29C 53/00* (2013.01); *B29C 53/602* (2013.01); *B29C 53/8041* (2013.01); *B29C 70/30* (2013.01); *B29C 70/32* (2013.01); *B29C 70/38* (2013.01); *B29C 70/382* (2013.01); *B29C 70/546* (2013.01); *F16J 12/00* (2013.01); *B29L 2031/7154* (2013.01); *B29L 2031/7172* (2013.01); *F17C 2203/0663* (2013.01); *F17C 2209/22* (2013.01); *Y10T 29/49771* (2015.01)

(58) Field of Classification Search
CPC ......... B29C 70/56; B29C 70/30; B29C 70/32; B29C 70/38; B29C 70/382; B29C 70/546; B29L 2031/7172; F17C 2203/0663; F17C 2209/22; F16J 12/00; Y10T 29/49771
See application file for complete search history.

(56) References Cited

U.S. PATENT DOCUMENTS

| | | | |
|---|---|---|---|
| 6,425,172 B1 * | 7/2002 | Rutz | B29C 70/56 156/162 |
| 7,763,137 B2 * | 7/2010 | Ohta | B29C 53/602 156/169 |

(Continued)

FOREIGN PATENT DOCUMENTS

| | | |
|---|---|---|
| DE | 11-2011-105750 T5 | 12/2014 |
| DE | 11-2012-005634 B4 | 3/2017 |

(Continued)

*Primary Examiner* — Jermie E Cozart
(74) *Attorney, Agent, or Firm* — Oliff PLC (57) ABSTRACT

It is possible to achieve reduction in the occurrence of tension decrease at fiber bundles in a sheet. A method of manufacturing a tank includes several steps. A feed step is carried out of feeding a sheet including aligned fiber bundles while applying tension to the sheet in the longitudinal directions of the fiber bundles. The method further includes a detection step of detecting a decreased tension part subjected to tension decrease in the sheet being fed and a tension recovery step of compensating for the tension decrease at the decreased tension part by spraying an organic solvent if the decreased tension part is detected in the detection step. The method also includes a winding step of winding the sheet having been fed on a liner.

6 Claims, 5 Drawing Sheets

(51) Int. Cl.
   *F16J 12/00*    (2006.01)
   *B29C 70/38*    (2006.01)
   *B29L 31/00*    (2006.01)
   *B29C 53/00*    (2006.01)
   *B29C 53/60*    (2006.01)

(56) References Cited

U.S. PATENT DOCUMENTS

| | | | |
|---|---|---|---|
| 8,116,899 B1* | 2/2012 | Johnson | B29C 70/56 |
| | | | 19/240 |
| 8,652,570 B2* | 2/2014 | Arvidson | B29C 70/20 |
| | | | 427/175 |
| 2003/0037885 A1* | 2/2003 | Hauber | B29C 63/10 |
| | | | 156/425 |
| 2003/0052212 A1* | 3/2003 | Anderson | B29C 53/665 |
| | | | 242/436 |
| 2013/0092311 A1 | 4/2013 | Kobayashi | |
| 2015/0001214 A1 | 1/2015 | Jung et al. | |
| 2016/0354970 A1 | 12/2016 | Taki | |

FOREIGN PATENT DOCUMENTS

| | | |
|---|---|---|
| EP | 0 547 330 A2 | 6/1993 |
| JP | H03-162932 A | 7/1991 |
| JP | 2009-191904 A | 8/2009 |
| JP | 2015-214051 A | 12/2015 |
| JP | 2016-223569 A | 12/2016 |
| KR | 10-0963147 B1 | 6/2010 |
| WO | 2008/072050 A2 | 6/2008 |

\* cited by examiner

METHOD OF MANUFACTURING TANK

CROSS-REFERENCE TO RELATED APPLICATIONS

The present application claims priority from Japanese patent application 2017-111371 filed on Jun. 6, 2017, the entirety of the content of which is hereby incorporated by reference into this application.

BACKGROUND

Field

The present disclosure relates to a method of manufacturing a tank.

Related Art

A high-pressure tank storing fuel gas used for natural gas automobiles or fuel cell automobiles may include a sheet layer formed by winding a sheet including aligned fiber bundles.

According to a method of manufacturing a tank described in JP 2016-223569 A, however, tension decrease occurring at a part of the fiber bundles forming the sheet before being wound has caused a problem of failing to ensure intended strength of the sheet layer after manufacture of the tank. Hence, a technique is desired to be developed such that, even if there is a part subjected to tension decrease in the fiber bundles forming the sheet before being wound, the occurrence of tension decrease at the fiber bundles in the sheet layer of the tank is still reduced after the winding of the sheet.

SUMMARY

According to one aspect of the present disclosure, a method of manufacturing a tank is provided. The method of manufacturing a tank includes: a feed step of feeding a sheet including aligned fiber bundles while applying tension to the sheet in the longitudinal directions of the fiber bundles; a detection step of detecting a decreased tension part subjected to tension decrease in the sheet being fed; a tension recovery step of compensating for the tension decrease at the decreased tension part by spraying an organic solvent if the decreased tension part is detected in the detection step; and a winding step of winding the sheet having been fed on a liner.

DETAILED DESCRIPTION

A. Embodiment

A1. Configuration of Tank

Figure 1:
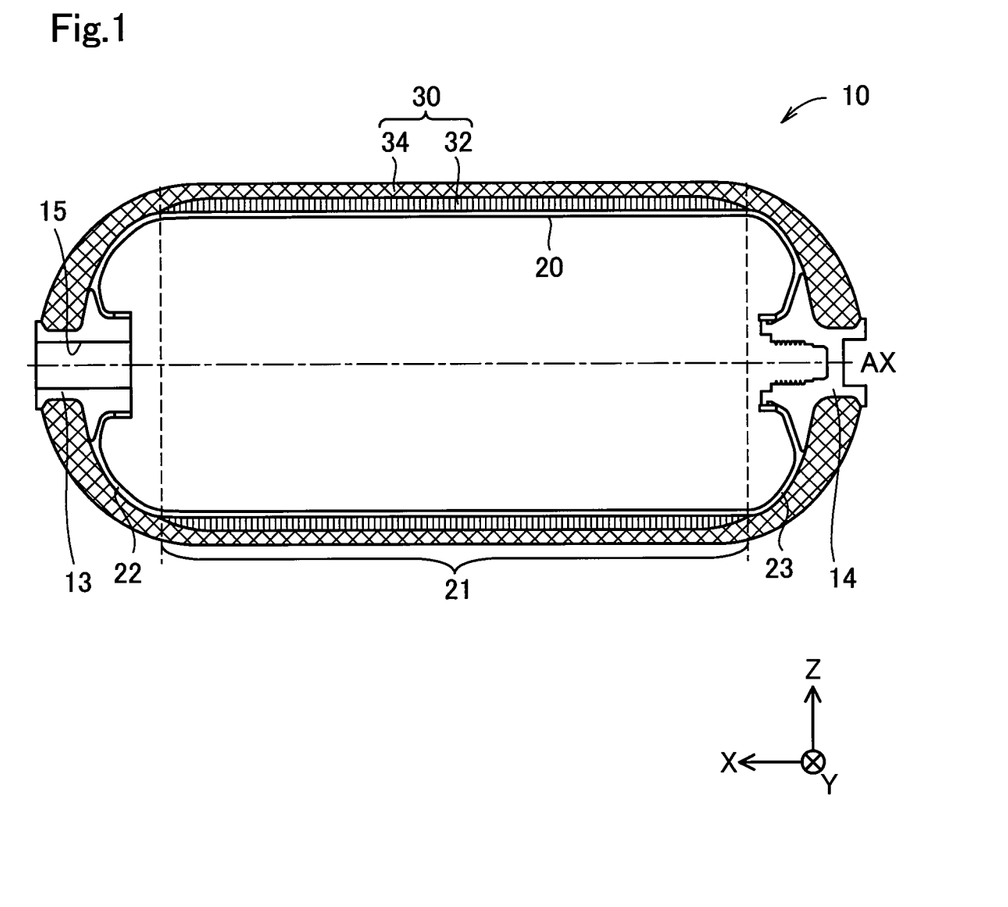
FIG. 1 is a sectional view showing the configuration of a tank in outline.

FIG. 1 is a sectional view showing in outline the configuration of a tank 10 manufactured by a manufacturing method according to an embodiment of the present disclosure. FIG. 1 shows an X axis, a Y axis, and a Z axis orthogonal to each other. The X, Y, and Z axes in FIG. 1 correspond to an X axis, a Y axis, and a Z axis in other drawings. The tank 10 of this embodiment stores hydrogen gas at a high pressure of about 70 MPa, for example. The tank 10 includes a liner 20 and a reinforcing layer 30.

The liner 20 is a hollow liner made of resin. The liner 20 is made of thermoplastic resin such as polyethylene, nylon, polypropylene, or polyester, for example. The liner 20 has an axis line common to an axis line AX of the tank 10. The liner 20 includes a straight section 21, a dome section 22, a dome section 23, a ferrule 13, and a ferrule 14.

The straight section 21 has a cylindrical shape. The dome sections 22 and 23 are provided at opposite ends of the straight section 21 and are each formed into a curved plane projecting outwardly from the liner 20. The ferrules 13 and 14 are made of metal such as aluminum or stainless steel, and are provided at the tops of the dome sections 22 and 23 respectively. The ferrule 13 has a through hole 15 and is used for taking gas out from the inside of the tank 10 or refilling the inside of the tank 10 with gas. The other ferrule 14 is used for reinforcing the liner 20 or for rotating the liner 20 during formation of the reinforcing layer 30. The ferrule 14 is omissible.

The reinforcing layer 30 is a layer covering the periphery of the liner 20 and used for reinforcing the liner 20. The reinforcing layer 30 includes a sheet layer 32 and a helical layer 34. The sheet layer 32 and the helical layer 34 may also be called an inner layer and an outer layer respectively.

The sheet layer 32 is formed by winding and stacking multiple turns of a sheet including aligned fiber bundles on the external surface of the straight section 21 of the liner 20. The sheet of this embodiment is formed by impregnating the fiber bundles aligned in one direction with thermosetting resin. More specifically, the sheet of this embodiment is formed by impregnating the fiber bundles made of carbon fibers with epoxy resin. The fibers in the fiber bundles forming the sheet may be reinforcing fibers such as glass fibers or aramid fibers, for example. Resin for impregnation of the fiber bundles may be thermosetting resin such as phenol resin or unsaturated polyester resin, for example. In this embodiment, assuming that a direction of winding of the sheet, specifically, the circumferential direction of the straight section 21 is one direction, the fiber bundles in the sheet are aligned to be stretched in this direction. In other words, the fiber bundles are aligned while being stretched in a direction orthogonal to the width direction of the sheet. Such alignment of the fiber bundles in the sheet layer 32 is similar to alignment formed by winding the fiber bundles by hoop winding. Thus, the "sheet layer 32" may also be called a "hoop layer." In the case of a tank storing high-pressure gas such as the tank 10, a reinforcing layer has a larger thickness than a general fiber-reinforced resin material. Thus, the number of turns of a sheet for forming a sheet layer tends to be increased. Hence, it becomes more likely that a part of the sheet to be wound is wound on a distorted part of this sheet, thereby unfortunately increasing the risk of loosening of the sheet.

The helical layer 34 is formed by winding fiber bundles by helical winding on the sheet layer 32 and the dome sections 22 and 23. The fiber bundles used for the helical winding are formed by impregnating fiber bundles made of carbon fibers with thermosetting resin such as epoxy resin.

The respective thicknesses of the sheet layer 32 and the helical layer 34 are determined appropriately in accordance with the resistance to pressure or the strength required for the tank 10.

A2. Method of Manufacturing Tank

Figure 2:
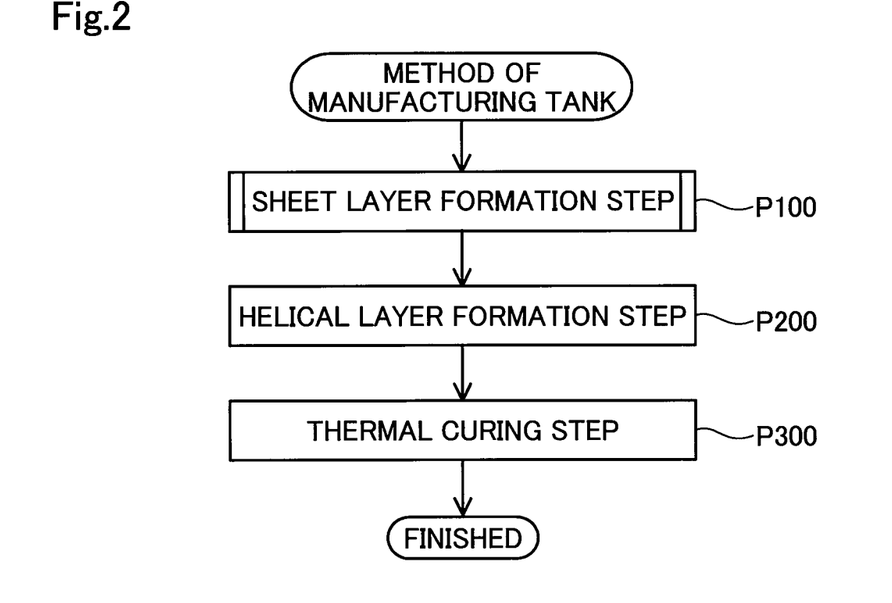
FIG. 2 is a process chart showing a method of manufacturing the tank.

FIG. 2 is a process chart showing a method of manufacturing the tank 10. The manufacturing method of this embodiment includes a sheet layer formation step (step P100) performed first in which the sheet layer 32 is formed by winding the sheet on the liner 20. The sheet layer formation step will be described in detail later.

After implementation of the sheet layer formation step (step P100), a helical layer formation step (step P200) is performed in which the helical layer 34 is formed by winding the fiber bundles on the liner 20 by helical winding. In the helical layer formation step, the fiber bundles are wound on a range including the dome sections 22 and 23 and the sheet layer 32 at a winding angle from zero to 30 degrees from the axis line AX of the tank 10. Specifically, in the helical layer formation step, the fiber bundles are wound on the sheet layer 32 and on the dome sections 22 and 23 of the liner 20.

After implementation of the helical layer formation step (step P200), a thermal curing step is performed for curing the sheet layer 32 and the helical layer 34 integrally with heat (step P300). As a result of a series of the foregoing steps, formation of the tank 10 is finished.

Figure 3:
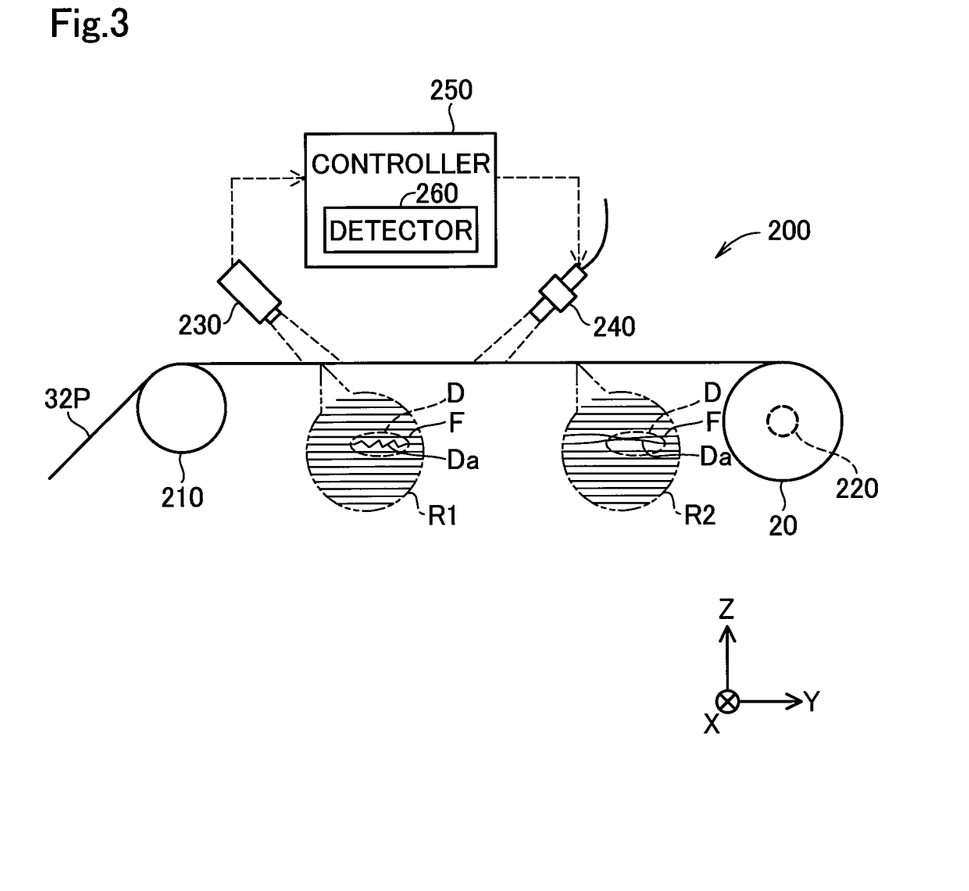
FIG. 3 is an explanatory view showing a sheet winding device.

FIG. 3 is an explanatory view showing a sheet winding device 200 used in the sheet layer formation step (step P100). FIG. 3 schematically shows a partial region R1 and a partial region R2 in a surface of a sheet 32P in an enlarged manner. The sheet 32P is a sheet for forming the sheet layer 32 by being wound on the liner 20. The regions R1 and R2 will be described later. The sheet winding device 200 includes a feed roller 210, a liner rotation unit 220, a camera 230, an injector 240, and a controller 250.

The feed roller 210 feeds the sheet 32P toward the liner rotation unit 220 while applying tension to the sheet 32P in the Y-axis direction. The feed roller 210 is configured to be movable in the Z-axis direction. The movement of the feed roller 210 in the Z-axis direction allows adjustment of the tension on the sheet 32P. In the manufacturing method of this embodiment, a direction in which the sheet 32P is fed is the Y-axis direction in which the fiber bundles forming the sheet 32P are stretched. The direction in which the fiber bundles are stretched is also called the longitudinal directions of the fiber bundles.

The liner rotation unit 220 rotates the liner 20 about the axis line AX of the liner 20 as a rotation axis while supporting the liner 20. The liner rotation unit 220 rotates the liner 20 in synchronization with the rotation of the feed roller 210.

The camera 230 is provided in a positive direction along the Z axis from the sheet 32P being fed between the feed roller 210 and the liner rotation unit 220. The camera 230 captures an image of a surface of the sheet 32P being fed pointing in the positive direction along the Z axis. Data of the image captured by the camera 230 is transmitted to the controller 250. In this embodiment, the camera 230 is a CCD camera. The camera 230 may alternatively be a CMOS camera.

The injector 240 includes multiple injectors 240 arranged in a positive direction along the Y axis from the camera 230, specifically, arranged downstream of the feed direction from the camera 230. The injectors 240 are aligned in the X-axis direction corresponding to the width direction of the sheet 32P while being separated toward the positive direction along the Z axis from the sheet 32P being fed. The injectors 240 are usable for spraying an organic solvent toward the surface of the sheet 32P pointing in the positive direction along the Z axis. In this embodiment, the injectors 240 are to spray acetone.

Figure 4:
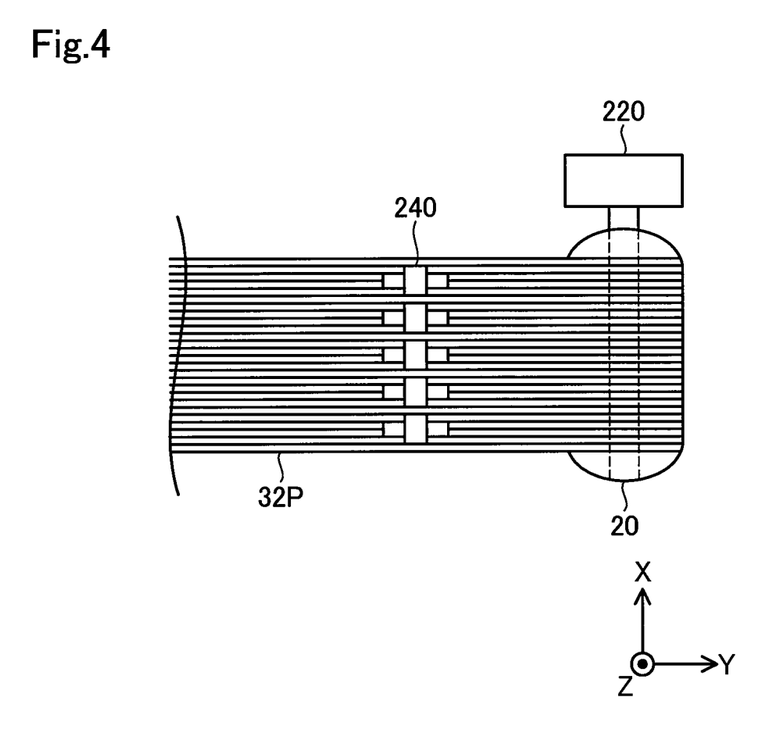
FIG. 4 is an explanatory view showing the sheet winding device viewed from a positive direction along a Z axis.

FIG. 4 is an explanatory view showing the sheet winding device 200 viewed from the positive direction along the Z axis in the sheet layer formation step (step P100). To facilitate understanding, FIG. 4 shows only the liner 20, the sheet 32P, the liner rotation unit 220, and the injectors 240. The multiple injectors 240 are aligned in the X-axis direction. In this embodiment, five injectors 240 are aligned in the X-axis direction.

Referring back to FIG. 3, the controller 250 controls the operation of each unit of the sheet winding device 200. The controller 250 includes a detector 260. The detector 260 detects a fiber bundle without tension in the sheet 32P under tension as a decreased tension part in which the tension on the sheet 32P is decreased. The decreased tension part specifically means a fiber bundle in a loosened state, compared to a fiber bundle in the sheet 32P stretched in the feed direction.

Figure 5:
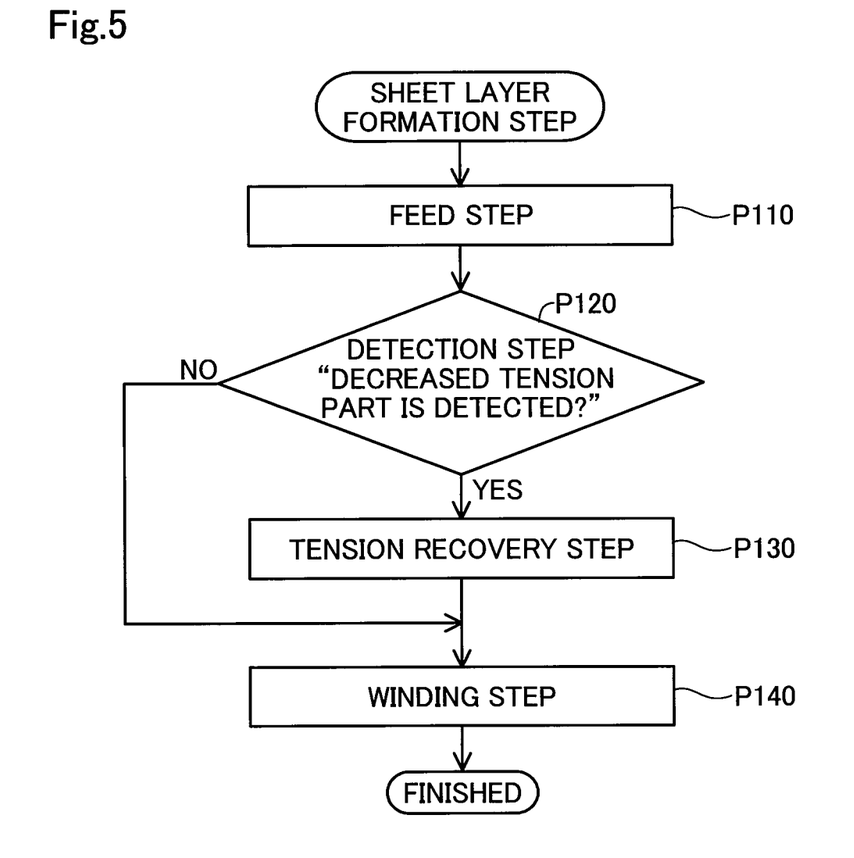
FIG. 5 is a process chart showing a sheet layer formation step in detail.

FIG. 5 is a process chart showing in detail the sheet layer formation step (step P100 in FIG. 2) in which the sheet layer 32 is formed by winding the sheet 32P on the liner 20 by the sheet winding device 200. When the sheet layer formation step (step P100) is started, a feed step (step P110) is performed in which the feed roller 210 feeds the sheet 32P while applying tension to the sheet 32P. The sheet 32P fed by the feed roller 210 is reeled on the liner 20 rotated by the liner rotation unit 220. Specifically, the feed step (step P110) continues until the flow goes to a winding step (step P140) described later.

A detection step is performed (step P120) in which a decreased tension part in the sheet 32P being fed is detected. In the detection step (step P120), the decreased tension part is detected by the detector 260. The detector 260 detects the decreased tension part based on the orientation angles of the fiber bundles in the sheet 32P appearing in an image captured by the camera 230.

More specifically, the detector 260 processes the image captured by the camera 230 to calculate the position of each fiber bundle, the orientation angle of each fiber bundle, and the density of the fiber bundles. Then, the detector 260 detects the decreased tension part in the following manner. The detector 260 detects a position as the decreased tension part in which there is a fiber bundle belonging to the fiber bundles and having a stretched part tilted a predetermined angle or more from a virtual reference line extending in the feed direction in which the sheet 32P is fed, and having the density of the fiber bundles goes out of a predetermined range. In this embodiment, the predetermined angle is in a range of plus or minus three degrees.

If a decreased tension part is detected in the detection step (step P120: YES), a tension recovery step (step P130) is performed in which the tension decrease at the decreased tension part is compensated for by spraying the organic solvent. More specifically, the following process is performed in the tension recovery step (step P130).

If a decreased tension part is detected in the detection step (step P120: YES), the organic solvent is sprayed from the injector 240 toward the decreased tension part in the surface of the sheet 32P pointing in the positive direction along the Z axis. In this embodiment, the organic solvent is sprayed on the decreased tension part from an injector 240 belonging to the multiple injectors 240 aligned in the X-axis direction and being located at a position corresponding to the position of the decreased tension part in the X-axis direction corresponding to the width direction of the sheet 32P. In other words, the organic solvent is sprayed from the injector 240 arranged at the position in the X-axis direction same as the position in the X-axis direction of the decreased tension part in the sheet 32P. In this embodiment, the organic solvent of an amount of 0.2 g is sprayed from the injector 240 on one decreased tension part. This amount is not limited to 0.2 g but the organic solvent to be sprayed may be of any amount capable of compensating for tension decrease. For example, this amount may be determined in accordance with the thickness of the sheet 32P or in accordance with the material of the sheet 32P.

Referring to FIG. 3, multiple solid lines in each of the regions R1 and R2 show the aligned fiber bundles forming the sheet 32P. The region R1 is a region in which the sheet 32P has a decreased tension part. The region R2 corresponds to the region R1 after the organic solvent is sprayed from the injector 240 on the region R1. If the detector 260 detects a decreased tension part D based on a captured image of an area in the sheet 32P including the region R1, the organic solvent is sprayed from the injector 240 toward the decreased tension part D. In the region R1, as a result of being sprayed with the organic solvent, a fiber bundle Da at the decreased tension part D is aggregated with a fiber bundle F being stretched in the Y-axis direction corresponding to the feed direction by van der Waals forces. The aggregation of the fiber bundle Da at the decreased tension part D and the fiber bundle F produces interaction between the fiber bundles, thereby compensating for the tension decrease at the decreased tension part D (see the region R2). Even after the organic solvent evaporates, the fiber bundle Da at the decreased tension part D and the fiber bundle F are still kept in a combined and aggregated state. Thus, the aggregation is maintained by a force stronger than the van der Waals forces, thereby recovering tension at the decreased tension part D.

If a decreased tension part is not detected in the detection step (step P120: NO), the tension recovery step (step P130) is not performed.

After the tension recovery step (step P130) is performed or if a decreased tension part is not detected in the detection step (step P120: NO), the winding step (step P140) is performed in which the sheet 32P having been fed is wound on the liner 20. If the tension recovery step (step P130) is not performed, the sheet 32P is wound on the liner 20 in the winding step (step P140) after being subjected to the detection step (step P120). After these steps, the sheet 32P wound on the liner 20 is cured with heat, thereby forming the sheet layer 32.

According to the foregoing embodiment, if the decreased tension part D in the sheet 32P is detected, the decreased tension part D is allowed to have tension recovered by the tension recovery step (step P130). This allows formation of the sheet layer 32 by winding the sheet 32P in which the decreased tension part D has recovered, making it possible to reduce the occurrence of tension decrease at the fiber bundles in the sheet layer 32 of the tank 10 after the winding of the sheet 32P. The foregoing method of manufacturing the tank 10 works effectively, particularly for winding a sheet directly on a liner made of resin such as the liner 20. The reason for this is that increasing tension applied to the sheet to be wound with the intention of reducing the occurrence of a decreased tension part causes the risk of distortion of the liner. In this regard, the foregoing method of manufacturing the tank 10 makes it possible to reduce the occurrence of tension decrease at the fiber bundles in the sheet layer 32 of the tank 10 after the winding of the sheet 32P without causing distortion of the liner 20.

In the method of manufacturing the tank 10 according to the embodiment, the organic solvent is to be sprayed from the five injectors 240 aligned in the X-axis direction. For this spraying, the multiple injectors 240 are aligned in the X-axis direction corresponding to the width direction of the sheet 32P. This makes it possible to reduce the occurrence of failure to spray the organic solvent properly on the decreased tension part D.

In the method of manufacturing the tank 10 according to the embodiment, the organic solvent is sprayed on the decreased tension part D from an injector 240 belonging to the multiple injectors 240 aligned in the X-axis direction and being located at a position corresponding to the position of the decreased tension part D in the X-axis direction corresponding to the width direction of the sheet 32P. In this way, the organic solvent is sprayed from the injector 240 belonging to the multiple injectors 240 and being located at a position corresponding to the position of the decreased tension part D in the width direction of the sheet 32P. This makes it possible to reduce the occurrence of spraying of the organic solvent on a position different from the decreased tension part D.

In the method of manufacturing the tank 10 according to the embodiment, the decreased tension part D is detected based on the orientation angles of the fiber bundles in the sheet 32P appearing in an image captured by the camera 230. This makes it possible to perform the detection step (step P120) without involving contact with the sheet 32P. This allows prevention of damage to the sheet 32P in the detection step (step P120), compared to a detection step involving contact with the sheet 32P.

B. Modifications

B1. First Modification

In the method of manufacturing the tank 10 according to the embodiment, a decreased tension part is detected based on the orientation angles of the fiber bundles in the sheet 32P appearing in an image captured by the camera 230. However, the present disclosure is not limited to this. For example, a decreased tension part may be detected based on a measurement result obtained using a non-contact tension meter usable for measuring tension on the sheet 32P while not contacting the sheet 32P. Examples of the non-contact tension meter include a tension meter for measuring tension based on change in an air pressure value by sending air to the sheet 32P being fed from a direction (a direction vertical to the surface of the sheet 32P) orthogonal to the feed direction, and a tension meter for measuring tension by vibrating the sheet 32P being fed, measuring the frequency of resultant sound generated from the sheet 32P, and converting the frequency to the tension. A decreased tension part may be detected based on both the orientation angles of the fiber bundles in the sheet 32P appearing in an image captured by the camera 230 and a measurement result obtained using the non-contact tension meter. This detection makes it possible to detect the decreased tension part with higher accuracy than detection of a decreased tension part based on only one of the orientation angles of the fiber bundles and a measurement result obtained using the non-contact tension meter.

B2. Second Modification

In the method of manufacturing the tank 10 according to the embodiment, the sheet layer 32 is formed by curing the sheet 32P wound on the liner 20 with heat. However, the present disclosure is not limited to this. For example, the sheet layer 32 may be formed by winding the sheet 32P on a mandrel and then curing the sheet 32P wound on the mandrel with heat. In this case, the sheet layer 32 is placed on the external surface of the liner 20 by separating the mandrel from the sheet layer 32 and then fitting the liner 20 to the sheet layer 32. This method of manufacturing the tank 10 works effectively, particularly for winding a sheet directly on a liner made of resin such as the liner 20. The reason for this is that increasing tension applied to the sheet to be wound with the intention of reducing the occurrence of a decreased tension part causes the risk of distortion of the liner. In this regard, this method of manufacturing the tank 10 makes it possible to reduce the occurrence of tension decrease at the fiber bundles in the sheet layer 32 of the tank 10 after the winding of the sheet 32P without causing distortion of the liner 20.

B3. Third Modification

In the method of manufacturing the tank 10 according to the embodiment, five injectors 240 are aligned in the X-axis direction. However, the present disclosure is not limited to this. For example, multiple injectors 240 may be aligned in a direction tilted from the Y-axis direction corresponding to the feed direction. Alternatively, multiple injectors 240 may be arranged at positions not overlapping each other viewed from the Y-axis direction.

B4. Fourth Modification

In the method of manufacturing the tank 10 according to the embodiment, the organic solvent is sprayed on a decreased tension part from an injector 240 belonging to the multiple injectors 240 aligned in the X-axis direction and being located at a position corresponding to the position of the decreased tension part D in the X-axis direction corresponding to the width direction of the sheet 32P. However, the present disclosure is not limited to this. For example, the organic solvent may be sprayed on the decreased tension part from all the multiple injectors 240. Alternatively, one injector 240 configured to be movable in the X-axis direction may move to a position in the X-axis direction same as the position in the X-axis direction of the decreased tension part D and then spray the organic solvent on the decreased tension part D.

B5. Fifth Modification

In the method of manufacturing the tank 10 according to the embodiment, a decreased tension part is detected based on the tilts of the fiber bundles from the virtual reference line extending in the feed direction in which the sheet 32P is fed. However, the present disclosure is not limited to this. For example, a decreased tension part may be detected based on the tilts of the fiber bundles from one of sides belonging to the sides defining the sheet 32P and facing each other in the width direction.

B6. Sixth Modification

In the method of manufacturing the tank 10 according to the embodiment, the sheet 32P is fed while the fiber bundles forming the sheet 32P are stretched in the feed direction. However, the present disclosure is not limited to this. If the sheet 32P is a sheet formed by aligning fiber bundles stretched in a direction tilted from the longitudinal direction of the sheet, for example, the sheet 32P may be fed while the fiber bundles forming the sheet 32P are aligned in the direction tilted from the feed direction. Even in this case, an effect comparable to the effect achieved by the method of manufacturing the tank 10 according to the embodiment is still achieved by recovering a decreased tension part.

B7. Seventh Modification

In the method of manufacturing the tank 10 according to the embodiment, the sheet layer 32 is formed by curing the sheet 32P wound on the liner 20 with heat. However, the present disclosure is not limited to this. For example, the sheet layer 32 may be formed by placing the liner 20 into a mold while the sheet 32P not impregnated with resin is wound on the liner 20, and then pouring resin under pressure into the mold.

B8. Eighth Modification

The sheet 32P used in the method of manufacturing the tank 10 according to this embodiment is a sheet formed by impregnating the fiber bundles aligned in one direction with thermosetting resin. However, the present disclosure is not limited to this. For example, the sheet 32P may be a sheet formed by impregnating fiber bundles aligned in two directions or more with thermosetting resin. If such a sheet is used, by feeding the sheet while applying tension to the respective longitudinal directions of the aligned fiber bundles, a decreased tension part is detected more easily in the detection step.

B9. Ninth Modification

In the method of manufacturing the tank 10 according to the embodiment, the organic solvent sprayed from the injector 240 is acetone. However, the present disclosure is not limited to this. For example, the organic solvent sprayed from the injector 240 may be selected from alcohol-based solvents such as methyl alcohol and ethyl alcohol, ketone-based solvents, ester-based solvents such as ethyl acetate and butyl acetate, ether-based solvents such as tetrahydrofuran, dioxane, and dimethyl sulfoxide, halogenated hydrocarbon-based solvents such as chlorobenzene, dichlorobenzene, and bromobenzene, aromatic hydrocarbon-based solvents such as toluene, xylene, ethylbenzene, and vinylbenzene, aliphatic hydrocarbon-based solvents, silicone-oil based solvents, and amine-based organic solvents. The organic solvent sprayed from the injector 240 preferably evaporates at high speed. In this regard, acetone, diethyl ether, and chloroform are preferable, for example. The organic solvent sprayed from the injector 240 preferably has a boiling point of 100 degrees C. or less or preferably has lower latent heat than water. The reason for spraying the organic solvent from the injector 240 is to avoid problems that might be caused by the use of water such as absorption of water by the liner, difficulty in curing epoxy resin, and susceptibility of epoxy resin to hydrolysis, for example.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) According to one aspect of the present disclosure, a method of manufacturing a tank is provided. The method of manufacturing a tank includes: a feed step of feeding a sheet including aligned fiber bundles while applying tension to the sheet in the longitudinal directions of the fiber bundles; a detection step of detecting a decreased tension part subjected to tension decrease in the sheet being fed; a tension recovery step of compensating for the tension decrease at the decreased tension part by spraying an organic solvent if the decreased tension part is detected in the detection step; and a winding step of winding the sheet having been fed on a liner. According to this aspect, if the decreased tension part in the sheet is detected, the decreased tension part is allowed to have tension recovered by the tension recovery step. This allows formation of a sheet layer by winding the sheet in which the decreased tension part has recovered, making it possible to reduce the occurrence of tension decrease at the fiber bundles in the sheet layer of the tank after the winding of the sheet.

(2) In the foregoing aspect, the organic solvent may be sprayed in the tension recovery step from multiple spray units separated from the sheet being fed and aligned in the width direction of the sheet, and usable for spraying the organic solvent toward a surface of the sheet. According to this aspect, the multiple spray units are aligned in the width direction of the sheet. This makes it possible to reduce the occurrence of failure to spray the organic solvent properly on the decreased tension part.

(3) In the foregoing aspect, the organic solvent may be sprayed in the tension recovery step from a spray unit belonging to the multiple spray units and being located at a position corresponding to the position of the decreased tension part in the width direction of the sheet. According to this aspect, the organic solvent is sprayed from the spray unit belonging to the multiple spray units and being located at a position corresponding to the position of the decreased tension part in the width direction of the sheet. This makes it possible to reduce the occurrence of spray of the organic solvent on a position different from the decreased tension part.

(4) In the foregoing aspect, in the detection step, the decreased tension part may be detected based on the orientation angles of the fiber bundles in the sheet appearing in an image captured by an image capture device. This aspect makes it possible to perform the detection step without involving contact with the sheet. This allows prevention of damage to the sheet in the detection step, compared to a detection step involving contact with the sheet.

(5) In the foregoing aspect, in the detection step, the decreased tension part may be detected based on a measurement result obtained using a non-contact tension meter usable for measuring tension in a non-contact state. This aspect makes it possible to perform the detection step without involving contact with the sheet. This allows prevention of damage to the sheet in the detection step, compared to a detection step involving contact with the sheet.

(6) According to a different aspect of the present disclosure, a method of manufacturing a tank is provided. The method of manufacturing a tank includes: a feed step of feeding a sheet including aligned fiber bundles while applying tension to the sheet in the longitudinal directions of the fiber bundles; a detection step of detecting a decreased tension part subjected to tension decrease in the sheet being fed; a tension recovery step of compensating for the tension decrease at the decreased tension part by spraying an organic solvent if the decreased tension part is detected in the detection step; a winding step of winding the sheet having been fed on a mandrel; a sheet layer formation step of forming a sheet layer by curing the sheet wound on the mandrel; and a fitting step of separating the sheet layer and the mandrel and then fitting a liner to the sheet layer. According to this aspect, if the decreased tension part in the sheet is detected, the decreased tension part is allowed to have tension recovered by the tension recovery step. This allows formation of the sheet layer by winding the sheet in which the decreased tension part has recovered, making it possible to reduce the occurrence of tension decrease at the fiber bundles in the sheet layer of the tank after the winding of the sheet.

The present disclosure is not limited to the method of manufacturing a tank but is applicable to various aspects including a tank itself and a device for manufacturing a tank, for example. The present disclosure is never limited to the foregoing aspects but is certainly feasible in various aspects within a range not deviating from the substance of the present disclosure.

What is claimed is:

1. A method of manufacturing a tank, comprising:
   a feed step of feeding a sheet including aligned fiber bundles while applying tension to the sheet in a longitudinal direction of the fiber bundles;
   a detection step of detecting a decreased tension part having a decreased tension in the sheet being fed;
   a tension recovery step of compensating for the decreased tension at the decreased tension part by spraying an organic solvent if the decreased tension part is detected in the detection step; and
   a winding step of winding the sheet having been fed on a liner of the tank.

2. The method of manufacturing a tank in accordance with claim 1, wherein
   the spraying of the organic solvent in the tension recovery step is performed with multiple spray units separated from the sheet being fed and aligned in the width direction of the sheet, the multiple spray units being configured to spray the organic solvent toward a surface of the sheet.

3. The method of manufacturing a tank in accordance with claim 2, wherein
   the spraying of the organic solvent in the tension recovery step is performed with a spray unit belonging to the multiple spray units and being located at a position corresponding to the position of the decreased tension part in a width direction of the sheet.

4. The method of manufacturing a tank in accordance with claim 1, wherein
   the detection step includes detecting the decreased tension part based on orientation angles of the fiber bundles in the sheet appearing in an image captured by an image capture device.

5. The method of manufacturing a tank in accordance with claim 1, wherein
   the detection step includes detecting the decreased tension part based on a measurement result of a non-contact tension meter being configured to measure tension in a non-contact state.

6. A method of manufacturing a tank, comprising:
   a feed step of feeding a sheet including aligned fiber bundles while applying tension to the sheet in a longitudinal direction of the fiber bundles;
   a detection step of detecting a decreased tension part having a decreased tension in the sheet being fed;
   a tension recovery step of compensating for the decreased tension at the decreased tension part by spraying an organic solvent if the decreased tension part is detected in the detection step;
   a winding step of winding the sheet having been fed on a mandrel;
   a sheet layer formation step of forming a sheet layer by curing the sheet wound on the mandrel; and
   a fitting step of separating the sheet layer and the mandrel and then fitting a liner of the tank to the sheet layer.

* * * * *